(12) United States Patent
Kawachi et al.

(10) Patent No.: US 8,878,441 B2
(45) Date of Patent: Nov. 4, 2014

(54) DISPLAY DEVICE AND GUIDE LAMP INCLUDING SAME

(75) Inventors: Hideharu Kawachi, Kobe (JP); Shin Ukegawa, Kyotanabe (JP); Yoshinori Tsuzuki, Kyoto (JP); Tadasi Nisimura, Kyoto (JP); Hiroyuki Hirose, Nishinomiya (JP); Masanao Okawa, Nara (JP)

(73) Assignee: Panasonic Corporation, Osaka (JP)

( * ) Notice: Subject to any disclaimer, the term of this patent is extended or adjusted under 35 U.S.C. 154(b) by 726 days.

(21) Appl. No.: 13/031,679

(22) Filed: Feb. 22, 2011

(65) Prior Publication Data
US 2011/0204789 A1 Aug. 25, 2011

(30) Foreign Application Priority Data

Feb. 22, 2010 (JP) .................. 2010-036559

(51) Int. Cl.
*H05B 37/00* (2006.01)
*G09F 13/00* (2006.01)
*G09F 13/22* (2006.01)
*H02J 9/06* (2006.01)

(52) U.S. Cl.
CPC .......... *G09F 13/22* (2013.01); *G09F 2013/225* (2013.01); *H02J 9/065* (2013.01); *G09F 13/005* (2013.01)
USPC ......... 315/160; 315/209 R; 315/312; 315/291

(58) Field of Classification Search
CPC G02B 6/0011; G02B 19/0061; G02F 1/1336; F21V 19/045
USPC ............ 315/86, 110, 169.3, 170, 172, 185 R, 315/186, 192, 193, 209 R, 210, 225, 287, 315/291, 294, 297, 299, 307, 312, 313, 362
See application file for complete search history.

(56) References Cited

U.S. PATENT DOCUMENTS

2007/0252846 A1 11/2007 Ozawa et al.
2008/0218071 A1* 9/2008 Kobayashi .................... 313/506

(Continued)

FOREIGN PATENT DOCUMENTS

CN 2212816 11/1995
CN 1622705 A 6/2005

(Continued)

OTHER PUBLICATIONS

The extended European search report dated Jul. 13, 2011.

(Continued)

*Primary Examiner* — Douglas W Owens
*Assistant Examiner* — Jianzi Chen
(74) *Attorney, Agent, or Firm* — Bacon & Thomas, PLLC

(57) ABSTRACT

A display device 1 includes light emitting sections 36, 37 of different luminous colors disposed between anode and cathode electrodes, current control units 34, 35 for controlling currents supplied to the light emitting sections 36, 37 to desired current levels, respectively, and an emergency power supply for supplying a current to the current control units 34, 35 in an emergency in which a commercial power source does not perform a desired function. When operated by the emergency power supply, the current control units turn on and off the light emitting sections 36, 37 of different luminous colors such that they are turned on during different periods of time. When the emergency power supply is used, the display device 1 controls turning on of the planar light emitting element using an organic EL light emitting element depending on luminous colors thereof, thereby suppressing the power consumption of the emergency power supply.

27 Claims, 7 Drawing Sheets

(56) References Cited

U.S. PATENT DOCUMENTS

2008/0232128 A1  9/2008  Shofar
2011/0043120 A1* 2/2011  Panagotacos et al. ........ 315/224

FOREIGN PATENT DOCUMENTS

| CN | 2771961     | 4/2006  |
| CN | 2920743 Y   | 7/2007  |
| CN | 101089930 A | 12/2007 |
| EP | 1 195 740   | 4/2002  |
| JP | H7-169572   | 7/1995  |
| JP | 2008-165337 | 7/2008  |
| WO | 2009/153961 A1 | 12/2009 |

OTHER PUBLICATIONS

Office Action dated Apr. 8, 2013 issued in corresponding Chinese application No. 201110045112.5 (w/English Summary thereof).
The Chinese Office Action dated Jun. 10, 2014 with English translation of Search Report.

* cited by examiner

DISPLAY DEVICE AND GUIDE LAMP INCLUDING SAME

FIELD OF THE INVENTION

The present invention relates to a display device and a guide lamp using an organic EL (Electro Luminescence) panel; and, more particularly, to a display device including an emergency power supply which is used in case of emergency such as power failure or the like and a guide lamp including the display device.

BACKGROUND OF THE INVENTION

Conventionally, a guide lamp has been used to guide people to an evacuation route in case of emergency such as fire or the like.

FIG. 8 is a schematic diagram of a conventional guide lamp 8 including a light transmitting case 81 formed of a synthetic resin such as an acrylic resin or the like and a fluorescence lamp 82 provided in the case 81. The case 81 has a mark showing a running person in two colors, e.g., green and white, and the fluorescence lamp 82 is connected to a lighting circuit connected to an AC power source.

The power of the AC power source may be interrupted in an emergency, so that an emergency power supply using a storage battery is connected to a lighting circuit. A current is constantly supplied to and stored in the emergency power supply in a normal case, and the emergency power supply supplies power to the lighting circuit when the power of the AC power source is interrupted in an emergency. However, the conventional guide lamp 8 is disadvantageous in that the fluorescence lamp 82 has a short life span and cannot be turned on for a long period of time due to rapid power consumption of the emergency power supply in an emergency.

Accordingly, there has been recently proposed a thin-type and long-life organic EL guide lamp 9 in which a planar light emitting element 92 is used as a backlight of a guide lamp panel 91 as shown in FIG. 9 (e.g., Japanese Patent Laid-open Publication No. 2008-165337).

In this organic EL device guide lamp 9, in order to avoid the problem that it is difficult to light for a logn period of time due to rapid power consumption of the emergency power supply in an emergency such as power failure or the like, the power consumption of the emergency power supply is reduced by decreasing brightness in the emergency by reducing a current flowing in an organic EL element as a light emitting element.

However, the conventional organic EL element guide lamp 9 is disadvantageous in that a sufficient lighting period of the guide lamp cannot be ensured due to deterioration of the emergency power supply in the emergency.

Moreover, in the conventional guide lamp, the mark showing a running person in two colors of green and white is provided at a translucent panel made of a synthetic resin, so that a contrast ratio between green and white is determined by transmissivity of the panel. Therefore, it is difficult to save the power by using the contrast ratio between green light and white light, for example.

SUMMARY OF THE INVENTION

In view of the above, the present invention provides a display device and a guide lamp, capable of reducing consumption of an emergency power supply by controlling lighting in accordance with a luminous color of a planar light emitting element using an organic EL material in case of using the emergency power supply.

In accordance with an aspect of the present invention, there is provided a display device including: a planar light emitting element having a light emitting layer disposed between an anode electrode and a cathode electrode; a current control unit for controlling a current supplied to the planar light emitting element to a desired current level; and an emergency power supply for supplying a current to the current control unit in an emergency in which a commercial power source does not perform a desired function, wherein the planar light emitting element has a plurality of light emitting sections of different luminous colors, and the current control unit separately controls turning on of the light emitting sections of different luminous colors when operated by the emergency power supply.

When operated by the emergency power supply, the current control unit may turn on and off the light emitting sections of different luminous colors such that they are turned on during different periods of time.

The light emitting sections of different luminous colors may include a white light emitting section and another color light emitting section, and when operated by the emergency power supply, the current control unit may turn on and off the light emitting sections such that a light emitting period of the white light emitting section becomes shorter than that of the another color light emitting section.

The light emitting sections of different luminous colors may include a white light emitting section and a green light emitting section, and when operated by the emergency power supply, the current control unit may turn on and off the light emitting sections such that a light emitting period of the white light emitting section becomes shorter than that of the green light emitting section.

When operated by the emergency power supply, the current control unit may control the currents supplied to the light emitting sections of different luminous colors by using a PWM signal.

When operated by the emergency power supply, the current control unit may control amplitudes of the currents supplied to the light emitting sections of different luminous colors.

In accordance with another aspect of the present invention, there is provided a guide lamp including the display device described above.

In accordance with the present invention described above, the planar light emitting element includes a plurality of light emitting sections of different luminous colors, and when operated by the emergency power supply, the current control unit separately controls the light emitting amounts of the light emitting sections of different luminous colors. Accordingly, it is possible to reduce the power consumption and prolong the lighting period of the guide lamp in an emergency.

Further, when the emergency power supply is used, the light emitting period of the light emitting section forming one display surface can be changed depending on the luminous color. Thus, the power saving can be achieved by decreasing a light emitting period of the light emitting section of a color having a high power consumption and increasing a light emitting period of the light emitting section of a color having a low power consumption.

In addition, the power can be further saved by turning on and off the light emitting sections such that the light emitting period of the white light emitting element becomes shorter than that of the another color light emitting section.

Moreover, by turning on and off the light emitting sections such that the light emitting period of the white light emitting element becomes shorter than that of the green color light emitting section, the power can be further saved, and the deterioration of visual perception can be prevented.

Furthermore, the current control unit can control on/off of the light emitting sections of different luminous colors such that they are tuned on during different periods of time by transmitting current pulse signals to the light emitting sections connected thereto by using the PWM signal. Therefore, the power can be further saved in an emergency.

Besides, the current control unit can change brightness of the light emitting sections of different luminous colors by supplying the currents of different values to the light emitting sections connected thereto by the amplitude control. Accordingly, the power can be further saved in an emergency.

Further, there can be provided a guide lamp using an organic EL panel which can save power by alternately turning on and off the light emitting sections of different luminous colors while maintaining the luminous colors in an emergency.

BRIEF DESCRIPTION OF THE DRAWINGS

The objects and features of the present invention will become apparent from the following description of embodiments, given in conjunction with the accompanying drawings, in which:

FIGS. 5A and 58 illustrate display examples of the display device operated by the emergency power supply;

DETAILED DESCRIPTION OF THE EMBODIMENT

Embodiment

Figure 1A:
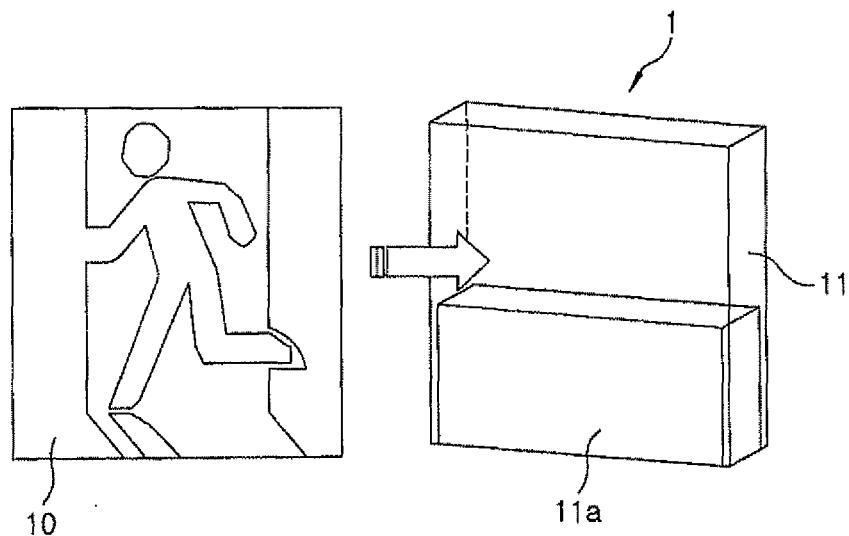
FIG. 1A is an exploded perspective view of a display device using an organic EL display panel in accordance with an embodiment of the present invention.

A display device and a guide lamp in accordance with an embodiment of the present invention will be described with reference to the accompanying drawings which form a part hereof. As shown in FIG. 1A, a display device 1 includes an organic EL panel 10 and a device main body 11.

The organic EL panel 10 is used as a guide lamp for an emergency by emitting light from the mark showing a running person in two colors of green and white while using an organic EL element as a planar light emitting element. The organic EL panel 10 is a light source of a self light emitting type, so that, unlike an LED type backlight used for a liquid crystal panel, the display device 1 does not requires a light guiding plate and thus can have a thin structure.

Figure 1B:
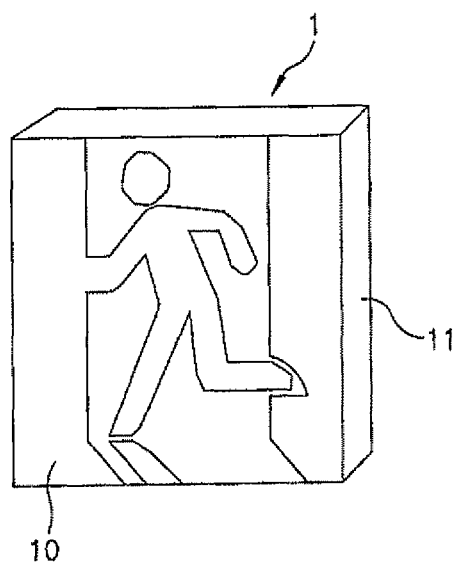
FIG. 1B is a perspective view of a guide lamp.

Further, a box 11a in the device main body 11 has therein an emergency power supply, a current control unit for controlling emission of green light and white light of the organic EL panel 10 in an emergency and the like. FIG. 1B shows the exterior of the display device used as a guide lamp.

Figure 2A:
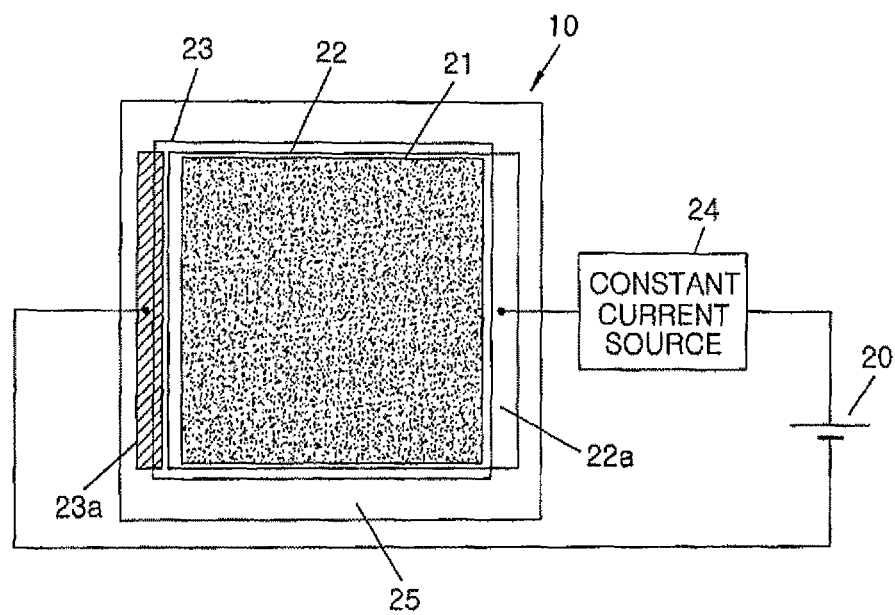
FIG. 2A is an explanatory view of a light emitting element and a lighting circuit of the organic EL panel used in the display device in accordance with the embodiment of the present invention.

Hereinafter, the structure of the planar light emitting element constituting the organic EL panel 10 will be described with reference to FIGS. 2A and 2B. As shown in FIG. 2A, the organic EL panel 10 is formed by embedding a planar light emitting layer 21 containing an organic compound between a planar anode electrode 22 of a display surface side and a planar cathode electrode 23. The organic EL panel 10 applies a DC output from a constant current source 24 connected to a DC power supply unit 20 to a power input portion 22a of the anode electrode 22 and a power input portion 23a of the cathode electrode 23, thereby generating exciton of the organic compound contained in the light emitting layer 21. The organic EL panel 10 emits the light radiated when the exciton returns to the ground state.

Figure 2B:
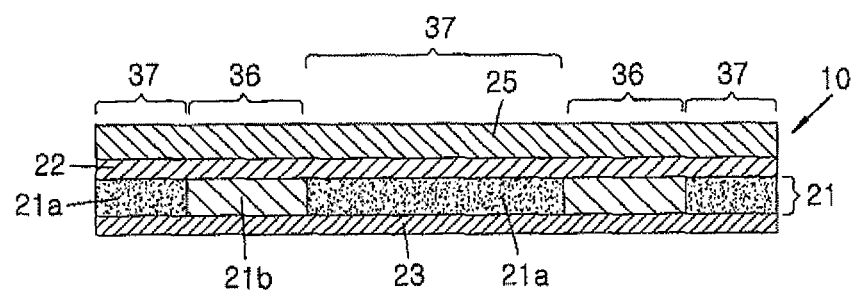
FIG. 2B is a cross sectional view of the organic EL panel.

FIG. 2B is a cross sectional view of the organic EL panel 10 including a transparent glass 25 as a display surface, the planar anode electrode 22 as a transparent electrode made of ITO (Indium Tin Oxide) or the like, the light emitting layer 21 having a green light emitting layer 21a and a white light emitting layer 21b which are formed on the same plane, and the planar cathode electrode 23 which is a metal electrode.

As described above, the light emitting layer 21 of the organic EL panel 10 includes the green light emitting layer 21a and the white light emitting layer 21b which are formed on the same plane. The white and the green light emitting layer 21b and 21a constitute white and green light emitting sections 36 and 37, respectively. The white light emitting layer 21b includes three stacked light emitting layers of R (red), G (green) and B (blue), and the green light emitting layer 21a includes a single light emitting layer of G (green). The light emitting sections 36 and 37 are connected to respective current control units 34 and 35. Specifically, although not shown in FIGS. 2A and 2B, the anode electrodes corresponding to the white light emitting section 36 and the green light emitting section 37 are insulated from each other and the anode electrodes are connected to the respective current control units 34 and 35. Meanwhile, the cathode electrode is common to the white and the green light emitting section 36 and 37 and connected to a ground.

With thus configuration, the display device 1 can turn on only the green light emitting section 37 (having, e.g., a person shape) of the organic EL panel 10 or alternately turn on and off the green light emitting section 37 and the white light emitting section 36 serving as a background portion. The guide lamp can provide a better visual perception by alternately turning on and off the green and the while light emitting section.

Although the planar light emitting elements of the present embodiment have luminous colors of green and white, the luminous colors of the planar light emitting elements are not limited thereto. Further, the cross sectional structure of the organic EL panel 10 shown in FIG. 2B is merely an example, and the organic EL panel 10 may have another structure including an electron transport layer, a hole transport layer or the like.

Figure 3:
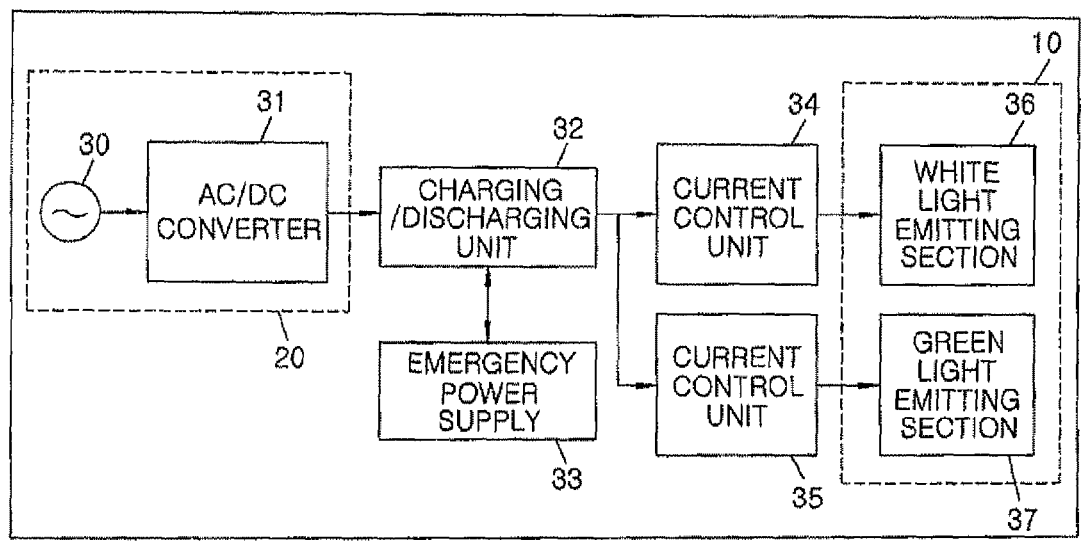
FIG. 3 is a function block diagram of the display device in accordance with the embodiment of the present invention.

Hereinafter, the functional configuration of the display device 1 in accordance with the present embodiment will be described with reference to FIG. 3. The display device 1 includes a DC power supply unit 20 having an AC power source 30 and an AC/DC converter 31, a charging/discharging unit 32, an emergency power supply 33, current control units 34 and 35, and the organic EL panel 10 having the white and the green light emitting section 36 and 37. Although FIG. 3 illustrates that the power from the AC power source 30 is input through the AC/DC converter 31 and the charging/discharging unit 32, the AC/DC converter 31 and the charging/discharging unit 32 connected to the emergency power supply 33 may be omitted in the present invention.

The AC power source 30 is a commercial power source of, e.g., 100 V. The AC/DC converter 31 is a circuit for converting an AC commercial power from the AC power source 30 into a DC power of a constant voltage. The charging/discharging unit 32 performs charging of the emergency power supply 33 and distributes the output current of the DC power supply unit 20 to the current control units 34 and 35. Moreover, when no current is input from the AC/DC converter 31, the charging/discharging unit 32 distributes the output current of the emergency power supply 33 to the current control units 34 and 35.

The emergency power supply 33 is a secondary cell such as a rechargeable battery or the like which is used when the AC power source 30 is not available due to power failure or the like. In a normal case, the emergency power supply 33 is constantly charged with a current supplied via the charging/discharging unit 32. The emergency power supply 33 serves to supply power to the current control units 34 and 35 when the power supply of the AC power source is interrupted in an emergency.

Although it is not illustrated, each of the current control units 34 and 35 includes a circuit provided with a DC-DC converter (e.g., a series regulator or a switching regulator), a resistor, a constant current diode and the like. Furthermore, the current control units 34 and 35 supply a predetermined current from the DC power supply unit 20 to the light emitting sections 36 and 37 in a normal case, and supply controlled currents from the emergency power supply 33 to the respective light emitting sections 36 and 37 in an emergency such as power failure or the like. The current control units 34 and 35 can control the light emitting amounts of the light emitting sections 36 and 37 by adjusting the average value of the currents flowing in the respective light emitting sections 36 and 37.

The brightness of each light emitting section 36 or 37 is in proportion to the average value of the current. Therefore, the current control units 34 and 35 control the light emitting amounts of the respective light emitting sections 36 and 37 by using a PWM (Pulse Width Modulation) control signal in which the current is divided on a time basis, i.e., a pulse having a width $\Delta T$ is output in a cycle T. Alternatively, the light emitting amount may also be controlled by modulating the amplitude of the current.

In each of the light emitting sections 36 and 37, a current is supplied to the anode electrode and the cathode electrode from the corresponding current control unit 34 or 35. In an emergency, the current control units 34 and 35 control the currents supplied to the light emitting sections 36 and 37 such that the light emitting sections 36 and 37 are alternately turned on during different periods of time, respectively.

Figure 4A:
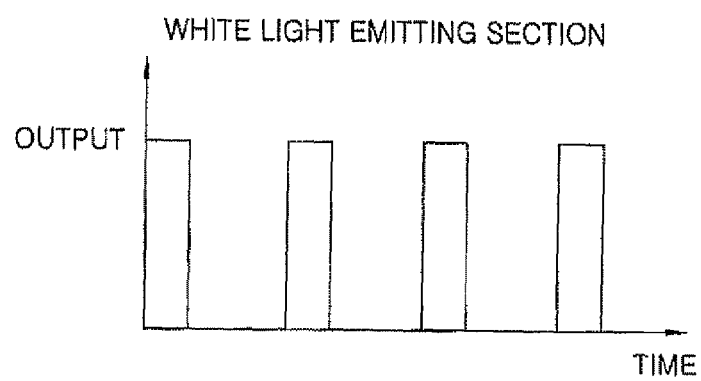
FIG. 4A provides reference diagrams of power outputs of an emergency power supply and current control units in an emergency in the display device in accordance with the embodiment of the present invention, and FIG. 48 provides reference diagrams of power outputs of current control units in a modification.
Figure 4A:
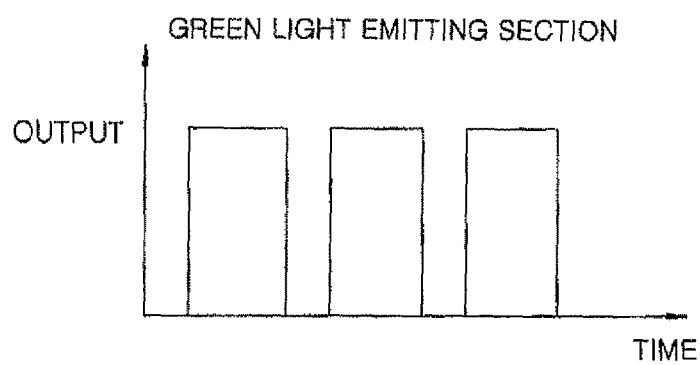

Hereinafter, the outputs of the current control units 34 and 35 in an emergency will be described with reference to FIG. 4A. FIG. 4A shows outputs from the current control circuits 34 and 35 in the case of controlling the light emitting amount by dividing the current on a time basis by the PWM signal. Specifically, there are illustrated the output 41 from the current control unit 34 to the white light emitting section 36, and the output 42 from the current control unit 35 to the green light emitting section 37.

In a normal case, the white and the green light emitting sections 36 and 37 are turned on by predetermined rated currents I1 and I2 from the AC power source 30. Meanwhile, in the emergency such as power failure or the like, as shown in FIG. 4A, the currents are alternately supplied from the emergency power supply 33 to the light emitting sections 36 and 37 through the current control units 34 and 35 so that the light emitting sections 36 and are alternately turned on during different periods of time, respectively.

Further, instead of alternately turning on and off the light emitting sections 36 and 37, it may also be possible to PWM-control the white and the green light emitting section 36 and 37 such that the current supply to the white light emitting section 36 has a smaller on-duty ratio compared with the green light emitting section 37.

As described above, the power can be saved by differentiating the light emitting periods of the light emitting sections of different luminous colors, for example, by decreasing the light emitting period of the white light emitting section having a higher power consumption compared with that of the different color (e.g., green) light emitting section to increase the ratio of the low output state (i.e., decrease the on-duty of the display device 1).

Hereinafter, display examples of the display device 1 operated by using the emergency power supply will be described with reference to FIGS. 5A and 5B.

Figure 5A:
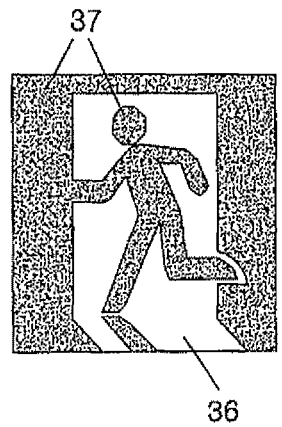
Figure 5B:
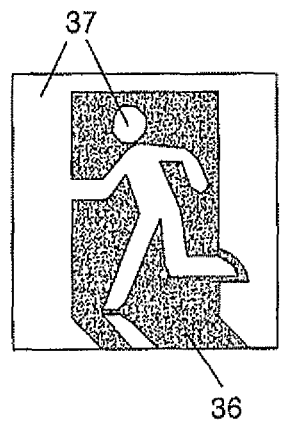

FIG. 5A shows the case in which only the green light emitting element 37 emits light, and FIG. 5B shows the case in which only the white light emitting element 36 emits light. In FIGS. 5A and 5B, the darker area indicates the light emitting area and the brighter area indicates the turned-off area. In the display device 1, in an emergency, the green and the white light emitting element 37 and 36 of the organic EL panel alternately indicate the displays shown in FIGS. 5A and 5B during different light emitting periods. In this case, since visual perception of the green light is better than that of the white light, even when the light emitting period of the white color becomes decreased compared to that of the green color by prolonging the latter, the visual perception of the display device 1 is not deteriorated.

Figure 6:
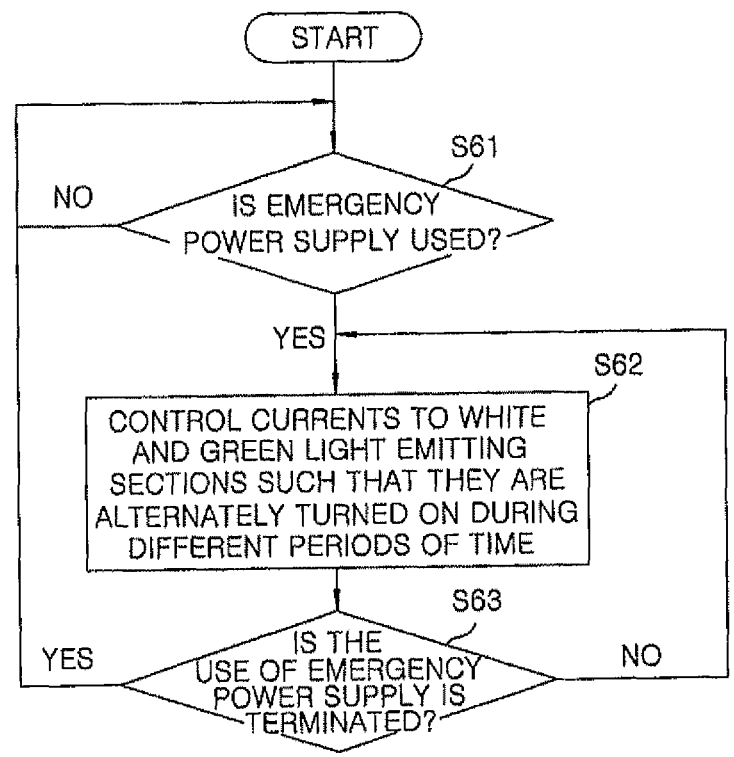
FIG. 6 is a flowchart showing an operation sequence of the display device in accordance with the embodiment of the present invention.

Hereinafter, the operation sequence of the display device 1 in accordance with the present embodiment will be described with reference to FIG. 6. First, the current control units 34 and 35 determine whether or not the emergency power supply is used based on a predetermined signal input (S61). Next, if the signal input is recognized, (Yes in S61), the current control units 34 and 35 transmit the currents controlled by using the pulse signals having different light emitting periods to the green and the white light emitting section (S62). Accordingly, in the emergency guide lamp, the green and the white light emitting sections start to be turned on and off during the different light emitting periods. On the other hand, in a normal case in which the signal input is not recognized (No in S61), the current control units 34 and 35 do not start the control operation.

Then, it is determined whether or not the use of emergency power supply is terminated (S63). If the use of the emergency power supply is terminated (Yes in S63), the process returns to S61. Otherwise, the process of S62 is carried out.

As described above, in the display device 1 of the present embodiment, when the emergency power supply 33 is used, the current control units 34 and 35 control the currents to the white and the green light emitting section 36 and 37 by using the PWM control signal such that the light emitting period of the white light emitting section 36 having a higher power consumption compared with that of the green light emitting section 37 is decreased to increase the ratio of the low output state, thereby saving the power consumption. In this case, in the display device 1, the visual perception of the guide lamp in the emergency is not deteriorated since the green color has a better visual perception than the white color.

(Modifications of the Embodiment)

Figure 7:
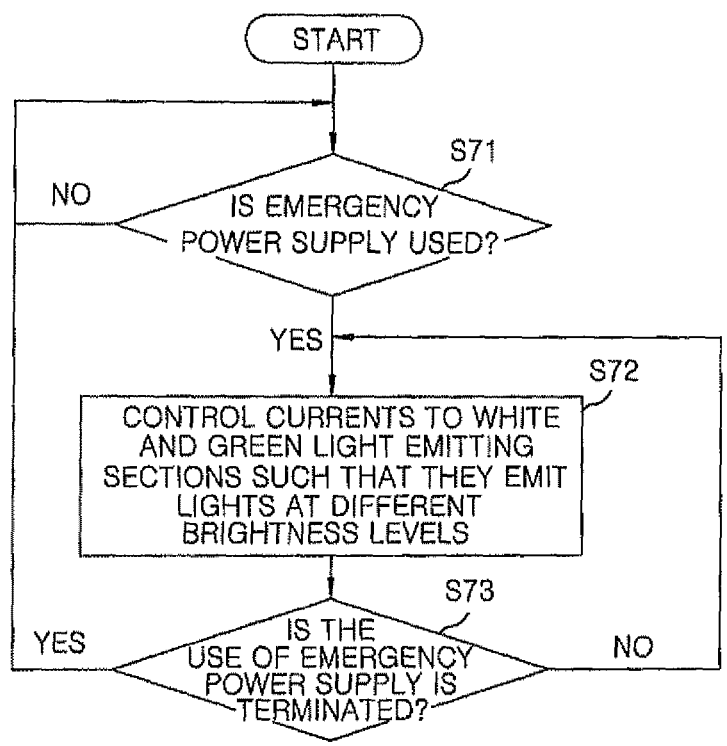
FIG. 7 is a flowchart showing an operation sequence of a display device in accordance with a modification of the embodiment of the present invention.
Figure 8:
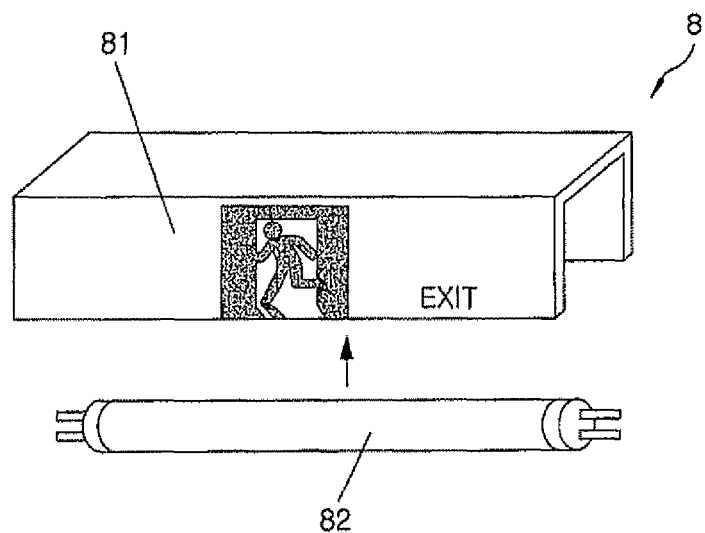
FIG. 8 is an exterior view of a guide lamp using a conventional fluorescence lamp.
Figure 9:
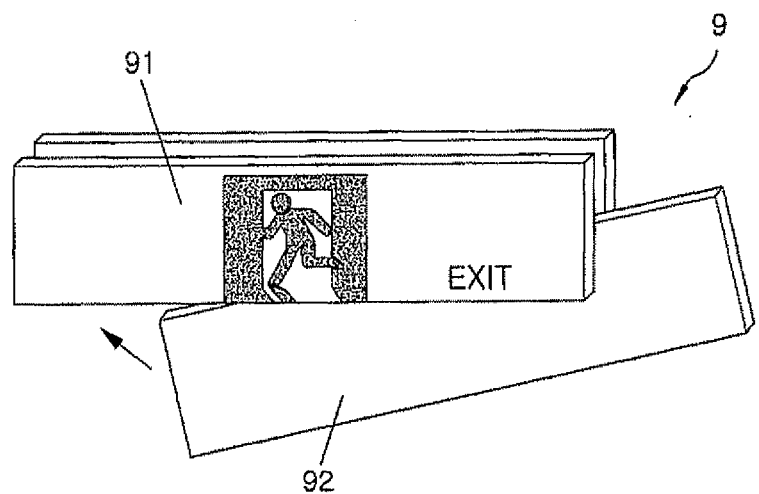
FIG. 9 is an exterior view of a guide lamp using a conventional organic EL light emitting element.

A first modification of the present embodiment will be described with reference to FIGS. 4B and 7.

Figure 4B:
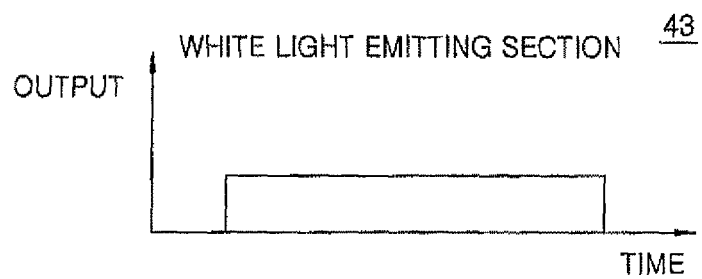
Figure 4B:
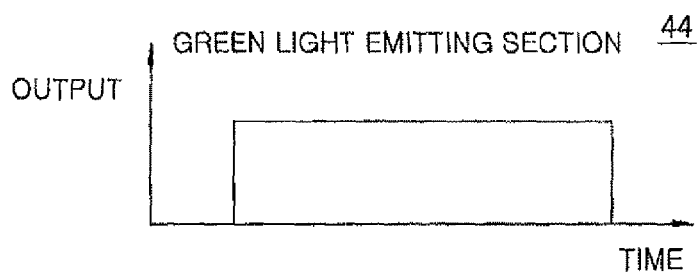

FIG. 4B shows the currents supplied to the light emitting sections of different luminous colors in the case of modulating the amplitudes of the currents by the current control units 34 and 35. In this case, the current amplitude of the green light emitting element 37 is greater than that of the white light emitting element 36. The power can be saved by decreasing the output and brightness of the white light emitting section having a higher power consumption compared with the green light emitting section. In other words, in this modification, the power can be saved by changing brightness of the light emitting sections of different luminous colors by the amplitude control.

Hereinafter, the operation sequence of the display device 1 in accordance with this modification will be described with reference to FIG. 7. First, the current control units 34 and 35 determine whether or not the emergency power supply is used based on a predetermined signal input (S71). Next, if the signal input is recognized (Yes in S71), the current control units 34 and 35 transmit the amplitude-controlled currents to the light emitting sections 36 and 37 such that the brightness of the green light emitting section 37 becomes higher than that of the white light emitting section 36 (S72). Meanwhile, in a normal case in which a signal input is not recognized (No in S71), the current control units 34 and 35 do not start the control operation.

Then, it is determined whether or not the use of the emergency power supply is terminated (S73). If the use of the emergency power supply is terminated (Yes in S73), the process returns to S71. Otherwise, the process of S72 is carried out.

As described above, when the emergency power supply 33 is used, the power control units 34 and 35 can save power, instead of by turning on and off the light emitting sections 36 and 37, by controlling the current amplitude such that the brightness of the white light emitting section 36 becomes higher than that of the green light emitting section 37.

While the invention has been shown and described with respect to the embodiments, various changes and modification may be made without departing from the scope of the invention. For example, although the organic EL light emitting element is used as the light emitting element in the above-described embodiments, it is also possible to use an inorganic EL light emitting element, or another device that is turned on by a DC current supplied thereto.

Further, it may also be possible to combine the embodiment and the modification. That is, the white and the green light emitting section 36 and 37 may be PWM-controlled while the magnitudes of the currents thereto are controlled such that the average brightness of the white light emitting section 36 becomes smaller than that of the green light emitting section 37.

In addition, the turning on of the organic EL panel used in the display device and the guide lamp of the present invention is controlled not only when the emergency power supply is used but also when the power needs to be saved in a normal case in which power failure or the like does not occur.

While the invention has been shown and described with respect to the embodiments, it will be understood by those skilled in the art that various changes and modification may be made without departing from the scope of the invention as defined in the following claims.

What is claimed is:

1. A display device comprising:
a planar light emitting element having a light emitting layer disposed between an anode electrode and a cathode electrode;
a current control unit controlling a current supplied to the planar light emitting element to a desired current level; and
an emergency power supply for supplying a current to the current control unit in an emergency in which a commercial power source does not perform a desired function,
wherein the planar light emitting element has a plurality of light emitting sections of different luminous colors, and the current control unit is configured to simultaneously and separately control turning on and off of the light emitting sections when operated by the emergency power supply.

2. The display device of claim 1, wherein when operated by the emergency power supply, the current control unit is configured to turn on and off the light emitting sections such that the light emitting sections are turned on during different periods of time.

3. The display device of claim 2, wherein the light emitting sections include a white light emitting section and another color light emitting section, and when operated by the emergency power supply, the current control unit is configured to turn on and off the light emitting sections such that a light emitting period of the white light emitting section becomes shorter than that of the another color light emitting section.

4. The display device of claim 3, wherein when operated by the emergency power supply, the current control unit is configured to control currents supplied to the light emitting sections by using PWM signals.

5. A guide lamp comprising the display device described in claim 4.

6. A guide lamp comprising the display device described in claim 3.

7. The display device of claim 3, wherein the white light emitting section is formed of three stacked layers of red, green, and blue, and the another light emitting section is formed of a single layer.

8. The display device of claim 3, wherein when operated by the emergency power supply, the current control unit is configured to turn on and off the light emitting sections such that a power consumed by the display device is reduced and a visual perception of the display device is not deteriorated.

9. The display device of claim 2, wherein the light emitting sections include a white light emitting section and a green light emitting section, and when operated by the emergency power supply, the current control unit is configured to turn on and off the light emitting sections such that a light emitting period of the white light emitting section becomes shorter than that of the green light emitting section.

10. The display device of claim 9, wherein when operated by the emergency power supply, the current control unit is configured to control currents supplied to the light emitting sections by using PWM signals.

11. A guide lamp comprising the display device described in claim 10.

12. A guide lamp comprising the display device described in claim 9.

13. The display device of claim 9, wherein the white light emitting section is formed of three stacked layers of red, green, and blue, and the green light emitting section is formed of a single layer.

14. The display device of claim 9, wherein when operated by the emergency power supply, the current control unit is configured to turn on and off the light emitting sections such that a power consumed by the display device is reduced and a visual perception of the display device is not deteriorated.

15. The display device of claim 2, wherein when operated by the emergency power supply, the current control unit is configured to control currents supplied to the light emitting sections by using PWM signals.

16. A guide lamp comprising the display device described in claim 15.

17. A guide lamp comprising the display device described in claim 2.

18. The display device of claim 1, wherein when operated by the emergency power supply, the current control unit is configured to control currents supplied to the light emitting sections of by using PWM signals.

19. A guide lamp comprising the display device described in claim 18.

20. The display device of claim 1, wherein when operated by the emergency power supply, the current control unit is configured to control amplitudes of currents supplied to the light emitting sections.

21. A guide lamp comprising the display device described in claim 20.

22. A guide lamp comprising the display device described in claim 1.

23. The display device of claim 1, wherein the light emitting sections include a first light emitting section of a first luminous color and a second light emitting section of a second luminous color, and
wherein one of the first and the second light emitting section has a predetermined shape, while the other light emitting section serves as a background portion around the predetermined shape.

24. The display device of claim 23, wherein the first light emitting section is formed of a single layer of the first luminous color and the second light emitting section is formed of three stacked layers of red, green, and blue.

25. The display device of claim 1, wherein when operated by the emergency power supply, the current control unit is configured to separately control light emitting amounts of the light emitting sections by adjusting average values of current flowing in the respective light emitting sections.

26. The display device of claim 1, wherein when operated by the emergency power supply, the current control unit is configured to alternately turn on and off the light emitting sections.

27. The display device of claim 1, wherein when operated by the emergency power supply, the current control unit is configured to separately control turning on of the light emitting sections so that the different luminous colors are visually perceivable from the light emitting sections.

\* \* \* \* \*